(12) United States Patent
Sahami et al.

(10) Patent No.: US 8,522,281 B1
(45) Date of Patent: Aug. 27, 2013

(54) HEAD END GENERALIZATION

(75) Inventors: Mehran Sahami, Palo Alto, CA (US); Richard C. Gossweiler, III, Sunnyvale, CA (US); Manish G. Patel, Mountain View, CA (US); John Blackburn, Newcastle, WA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 642 days.

(21) Appl. No.: 11/742,460

(22) Filed: Apr. 30, 2007

(51) Int. Cl.
*H04N 5/445* (2011.01)

(52) U.S. Cl.
USPC .................. 725/48; 725/37; 725/39; 725/40; 725/46; 725/49

(58) Field of Classification Search
None
See application file for complete search history.

(56) References Cited

U.S. PATENT DOCUMENTS

| | | | |
|---|---|---|---|
| 4,963,995 A | 10/1990 | Lang | |
| 5,010,499 A | 4/1991 | Yee | |
| 5,121,476 A | 6/1992 | Yee | |
| 5,589,892 A | 12/1996 | Knee et al. | |
| 5,793,438 A | 8/1998 | Bedard | |
| 5,805,235 A | 9/1998 | Bedard | |
| 5,808,694 A | 9/1998 | Usui et al. | |
| 5,903,816 A | 5/1999 | Broadwin et al. | |
| 5,940,073 A | 8/1999 | Klosterman et al. | |
| 5,956,716 A * | 9/1999 | Kenner et al. | 725/143 |
| 6,002,394 A | 12/1999 | Schein et al. | |
| 6,005,562 A | 12/1999 | Shiga et al. | |
| 6,005,565 A | 12/1999 | Legall et al. | |
| 6,014,184 A | 1/2000 | Knee et al. | |
| 6,133,910 A * | 10/2000 | Stinebruner | 725/49 |
| 6,147,715 A | 11/2000 | Yuen et al. | |
| 6,233,389 B1 | 5/2001 | Barton et al. | |
| 6,263,501 B1 | 7/2001 | Schein et al. | |
| 6,483,548 B1 | 11/2002 | Allport | |
| 6,493,878 B1 | 12/2002 | Kassatly | |
| 6,583,825 B1 * | 6/2003 | Yuen et al. | 348/731 |
| 6,640,337 B1 | 10/2003 | Lu | |
| 6,697,376 B1 * | 2/2004 | Son et al. | 725/95 |
| 6,769,128 B1 | 7/2004 | Knee et al. | |
| 7,124,426 B1 * | 10/2006 | Tsuria et al. | 725/39 |
| 7,328,450 B2 | 2/2008 | Macrae et al. | |
| 7,380,264 B2 * | 5/2008 | Potrebic | 725/151 |
| 7,493,015 B1 | 2/2009 | Van Stam et al. | |
| 7,627,882 B2 | 12/2009 | Finseth et al. | |
| 7,631,332 B1 * | 12/2009 | Franken et al. | 725/49 |
| 7,634,792 B2 * | 12/2009 | Michel et al. | 725/48 |
| 7,685,619 B1 | 3/2010 | Herz | |
| 7,734,680 B1 | 6/2010 | Kurapati et al. | |
| 2002/0007491 A1 * | 1/2002 | Schiller et al. | 725/91 |
| 2002/0138837 A1 * | 9/2002 | Fries et al. | 725/55 |
| 2004/0078807 A1 * | 4/2004 | Fries et al. | 725/48 |
| 2004/0221307 A1 * | 11/2004 | Arai et al. | 725/44 |
| 2006/0026643 A1 * | 2/2006 | Silverberg et al. | 725/46 |
| 2006/0037060 A1 * | 2/2006 | Simms et al. | 725/119 |
| 2006/0062363 A1 * | 3/2006 | Albrett | 725/48 |

(Continued)

*Primary Examiner* — Brian Pendleton
*Assistant Examiner* — Dika C. Okeke
(74) *Attorney, Agent, or Firm* — Fish & Richardson P.C.

(57) ABSTRACT

A computer-implemented method includes receiving information associated with a user of media services, wherein the received information does not uniquely identify one media head end for he user, identifying a plurality of head ends responsive to the received information, and generating, for display on a client device associated with the user, information for displaying a program guide aggregating channels for the plurality of head ends.

12 Claims, 10 Drawing Sheets

(56) References Cited

U.S. PATENT DOCUMENTS

| | | | |
|---|---|---|---|
| 2007/0245399 A1* | 10/2007 | Espelien | 725/39 |
| 2008/0022298 A1* | 1/2008 | Cavicchia | 725/25 |
| 2008/0263599 A1* | 10/2008 | Knudson et al. | 725/50 |
| 2008/0270449 A1 | 10/2008 | Gossweiler et al. | |
| 2008/0270886 A1 | 10/2008 | Gossweiler et al. | |
| 2008/0271078 A1 | 10/2008 | Gossweiler et al. | |
| 2008/0271080 A1 | 10/2008 | Gossweiler et al. | |
| 2009/0055385 A1 | 2/2009 | Jeon et al. | |

* cited by examiner

HEAD END GENERALIZATION

TECHNICAL FIELD

This document discusses techniques and mechanisms relating to electronic program guides, and more particularly to determining a head end or head ends to associate with a program guide.

BACKGROUND

Electronic program guides provide a common mechanism by which people can find television programming. These guides commonly display information about a number of programs in a grid of cells arranged by channel and time— much like their predecessor paper guides, such as those published in the old TV Guide magazines and in newspapers. The information, when displayed on a display device like a television, may be static, in that it is simply displayed to a user on a particular channel, such as in a continuously scrolling grid of channels. The information may also be interactive, in that users can scroll through the grid themselves and can select a certain cell to be switched to a program represented by the cell.

A guide is generally associated with a particular head end, or unique source of programming. For example, a viewer in Los Angeles will receive different programming than will a viewer in New York City, in part because the local news stations, local sports, public access, and other local and regional programming will differ between the two. In addition, even for national programming, such as the discovery channel, two viewers may access the programming through different television channels and at different times of the days (including different absolute (Zulu) times, and different times on the clock (e.g., prime time begins at 7 p.m. in the Midwest, but 8 p.m. on the West coast). Likewise, two viewers in the same geographic area may have different head ends, such as if two cable companies provide overlapping coverage (or at least coverage in the same zip code or similar area designation) or if the viewers have cable and satellite service respectively.

SUMMARY

This document includes descriptions of mechanisms and techniques for determining a head end for a user of a device, such as a television, a set top box, a desktop or laptop computer, or a portable telephone. Alternatively, if one definite head end cannot be determined reliably using information that is reasonably available to a system, multiple head ends may be identified, and programming information for the multiple head ends may be presented to the user in a combined fashion.

In one implementations, a computer-implemented method is disclosed. The method includes receiving information associated with a user of media services, wherein the received information does not uniquely identify one media head end for he user, identifying a plurality of head ends responsive to the received information, and generating, for display on a client device associated with the user, information for displaying a program guide aggregating channels for the plurality of head ends. The received information can comprise a zip code. The method may also include accessing a database identifying a plurality of head ends associated with the zip code.

In some aspects, identifying the plurality of head ends can include submitting the received information as a query to a repository of head end information. Also, the method can further comprise aggregating the channels on a per-channel basis. In addition, the plurality of head ends can be determined by comparing a factor that is based on a probability that the user receives a channel or head end, with a factor based on a probability that the user does not receive the channel or head end. In certain aspects, the program guide is sorted by available channels keyed to a primary head end. Also, the program guide can combine channels from a secondary head end with associated channels form a primary head end. Moreover, the program guide can show channels for each head end associated with a row of programming in a program guide.

In another implementation, a computer-implemented method is disclosed. The method includes receiving information relating to a location of a user of media services, determining that the received information does not uniquely identify a particular media distribution source, identifying a plurality of media distribution sources responsive to the received information, and formatting data for generating an aggregated electronic program guide for the plurality of media distribution sources in a grid having rows that combine channels from the plurality of media distribution sources. Determining that the received information does not uniquely identify a particular media distribution source includes submitting a query relating to the received information to a head end database and receiving a result of multiple head ends. The method may further include aggregating the channels on a per-channel basis. In addition, the method can comprising sorting the formatted data by available channels keyed to a primary head end. In certain aspects, the electronic program guide combines channels from a secondary head end with associated channels form a primary head end.

In yet another implementation, a computer-implemented system for identifying media-related information is disclosed. The system includes a repository of head end related information storing data concerning coverage of a plurality of media head ends, a head end module configured to identify one or more head ends addressed in the repository of head end information using information provided in a search request from a user, and a processor operating a schedule builder programmed to provide information for an electronic program guide that aggregates programming from multiple head ends in a single guide. The repository of head end related information can include information obtained from a media-related data aggregator.

In certain aspects, the program guide includes a plurality of rows, each row corresponding to a unique media schedule, and wherein one or more rows of the plurality of rows is associated with a different channel for more than one head end. Also, the schedule builder can be programmed to combine common programming from multiple head ends into common rows in the guide. In other aspects, the system can also include a page formatter to generate code for the display of search results responsive to a user request to be displayed simultaneously with the electronic program guide. Moreover, head end module can be configured to compare a factor that is based on a probability that a user receives a channel or head end with a factor based on a probability that the user does not receive the channel or head end.

The details of one or more embodiments are set forth in the accompanying drawings and the description below. Other features, objects, and advantages will be apparent from the description and drawings, and from the claims.

DESCRIPTION OF DRAWINGS

FIG. 1 shows displays illustrating interactions provided by an example program guide system.

FIGS. 1A-1C show particular displays from FIG. 1.

Like reference symbols in the various drawings indicate like elements.

DETAILED DESCRIPTION

Figure 1:
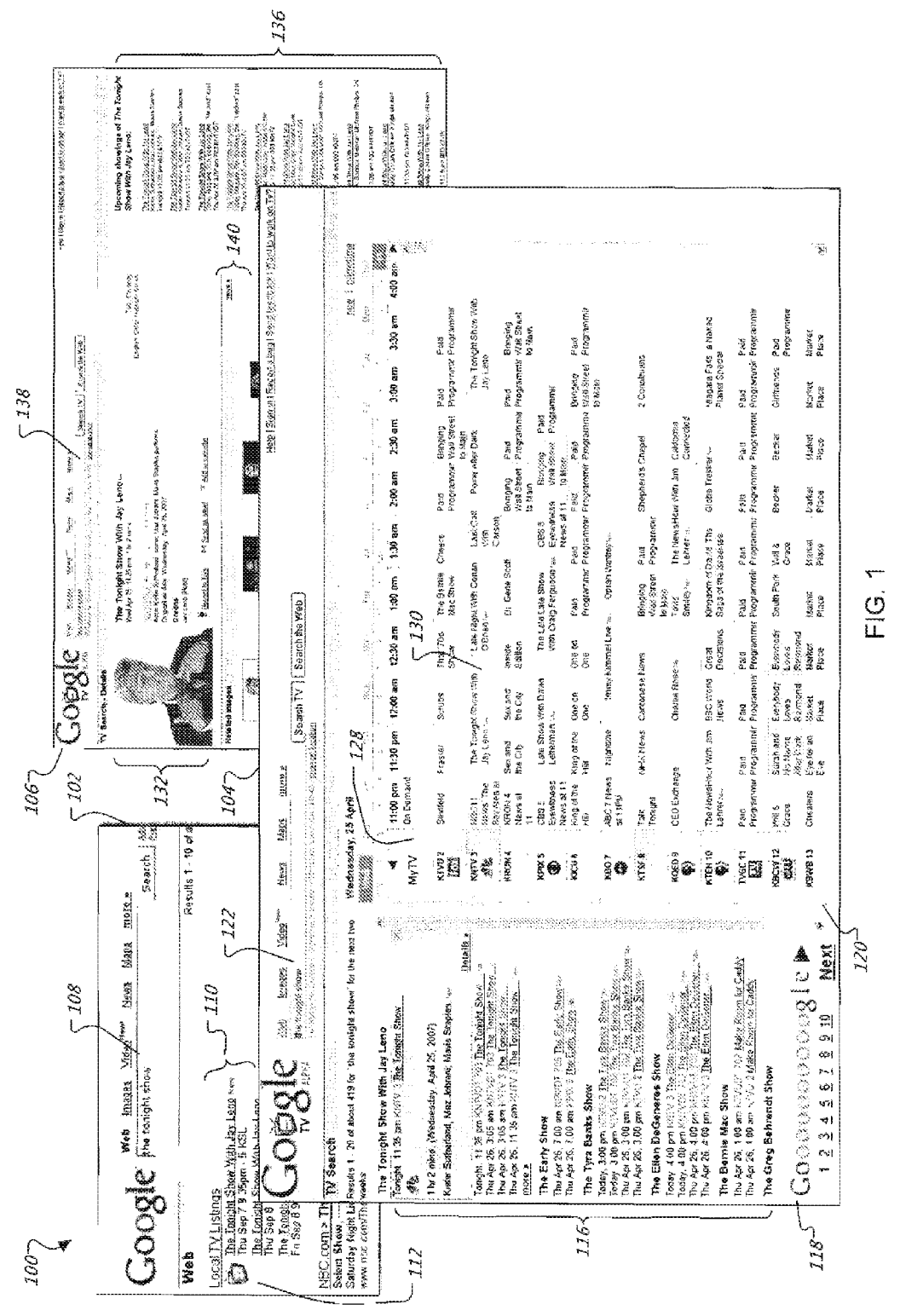
Figure 1A:
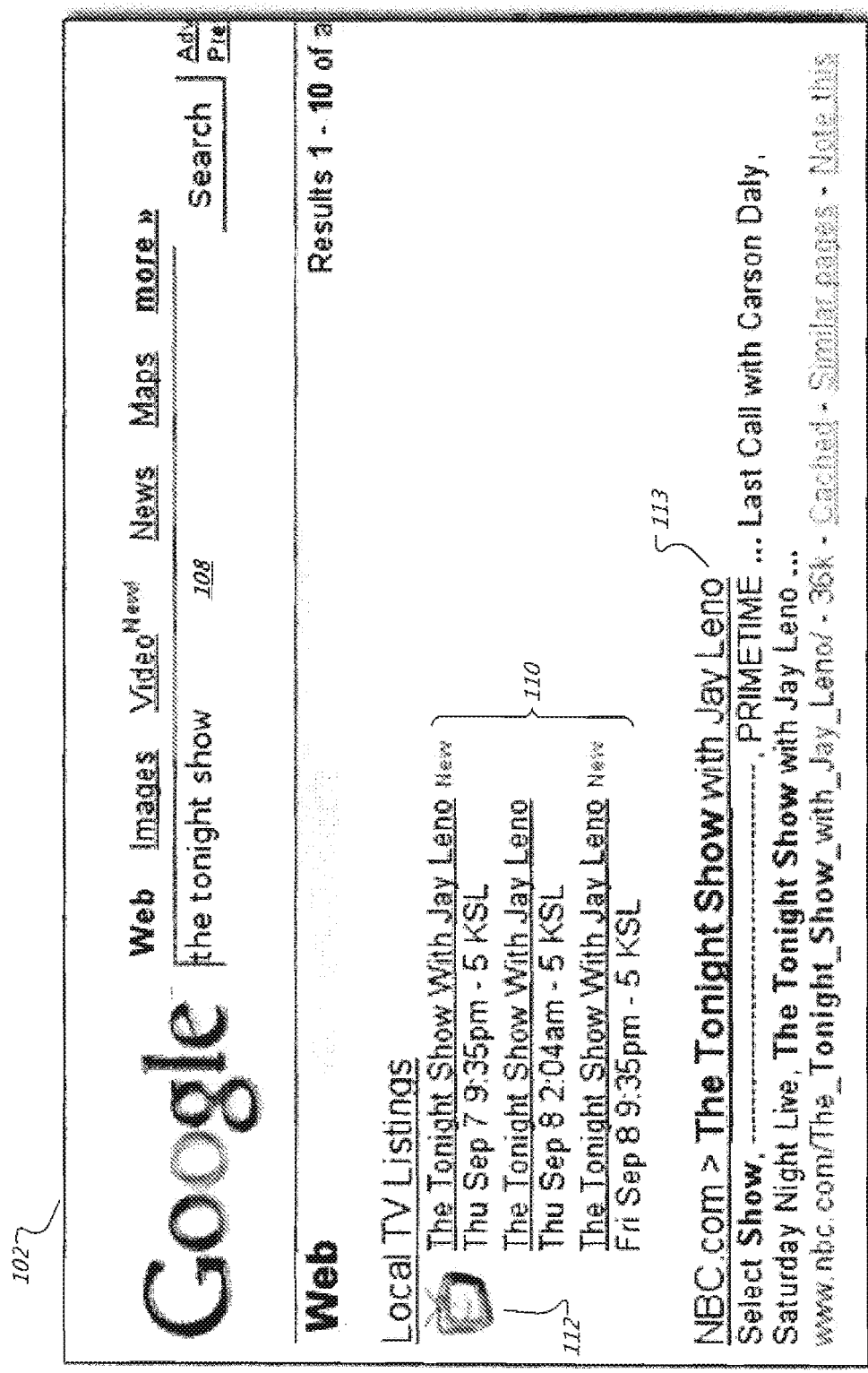
Figure 1B:
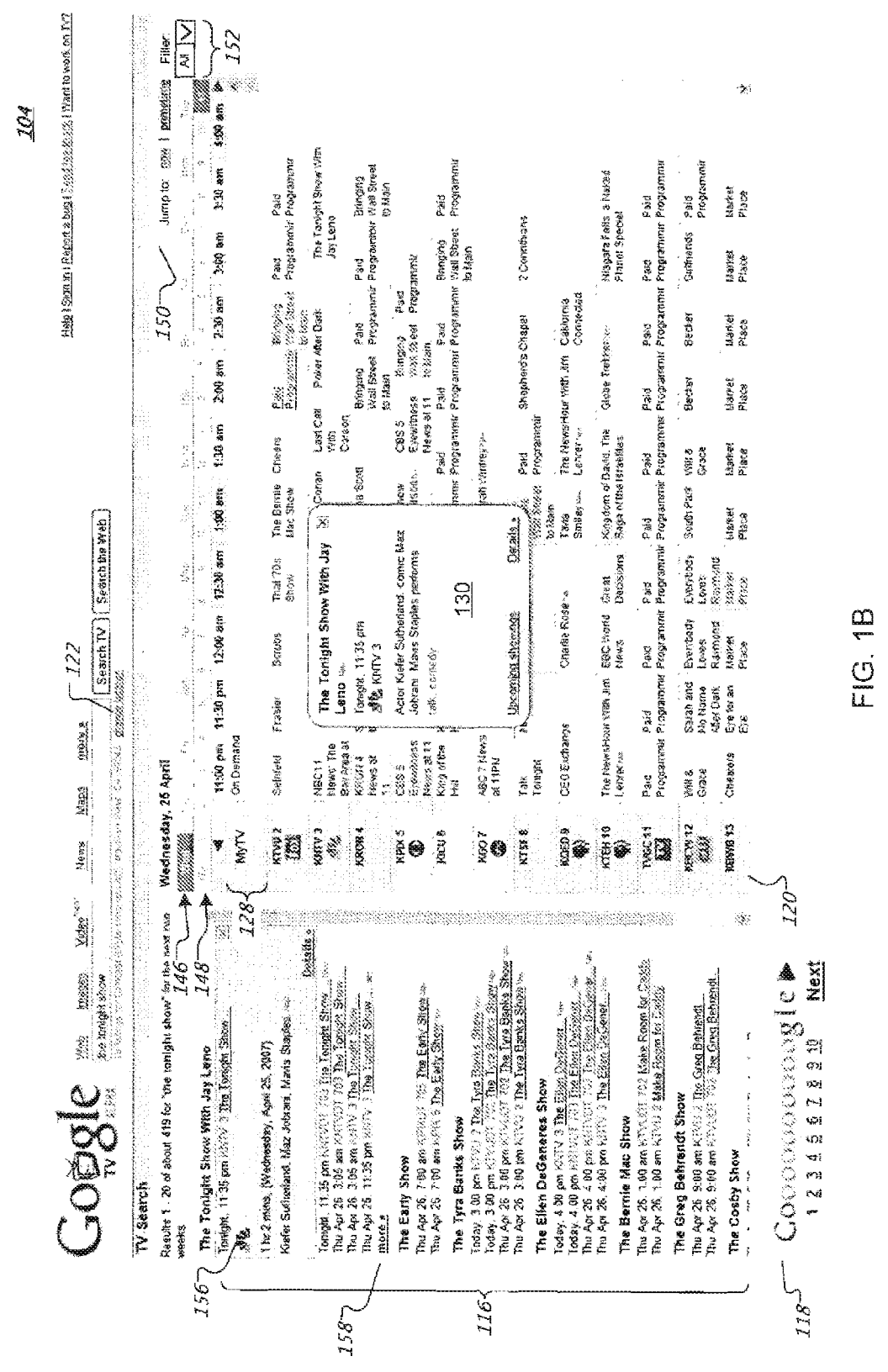
Figure 1C:
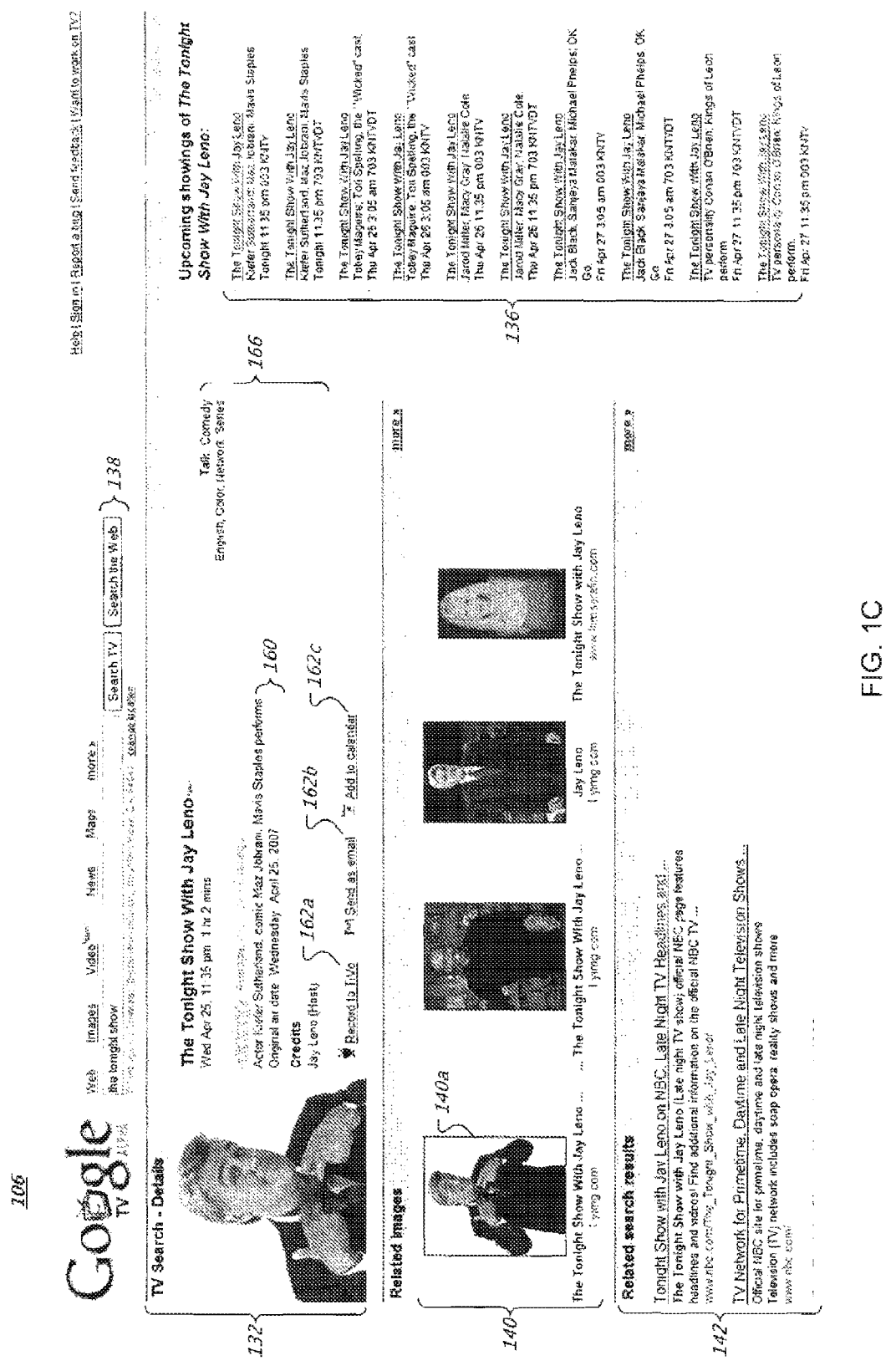

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as apposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116.

The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, A user may select a program in the schedule grid 120, and may select a command to move it to the personalized channel 128 or may drag it to the personalized channel, among other things.

Also, one user may send a message to another user that identifies a particular program, such as by supplying a URL to a on line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow. Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.xxxApr. 25, 2007xxx The details page 106 also includes a search details area 142. The search details area 142 may present the results of a search for web pages related to the program, such as a search result 142a. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140a.

The user may navigate to a web page related to the program by selecting a search result, such as the search result 142a, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

Figure 1D:
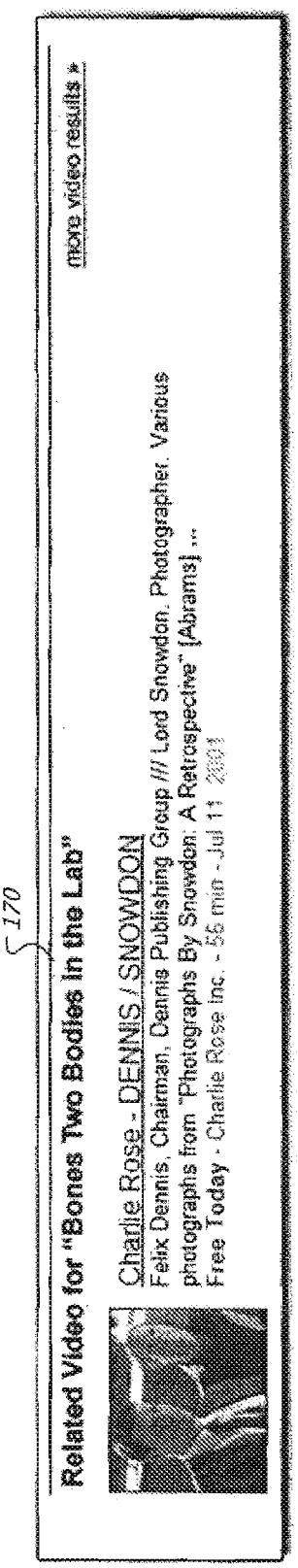
FIG. 1D shows a display for video-related information.

FIGS. 1A-1 show particular displays from FIG. 1 in more detail. FIG. 1D shows a display for video-related information. FIG. 1A shows the search page 102. The search page 102 allows a user to search for web content using the search control 108. The program guide system 100 determines that the search term (e.g., "The Tonight Show") may be a media program. For example, if the search term matches a media program name (such as a term stored in a "white list" of media-related terms) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "television." In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "The Tonight Show." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of episodes, grouped by program, matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIGS. 2A and 2B.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program, and left or right to a time associated with the program. This presents the program instance in the schedule grid 120. The schedule grid 120 may immediately present the selected program positioned properly in the grid or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104. For example, if a user selects the cell for "South Park," the grid 120 may re-center on that cell, and the groupings 116 may include programs such as "Beavis & Butthead," (another animated comedy), "The West Wing" (because of the directional reference), and other similar programs.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program. The shading, coloring, or sizing may also vary with the degree of separation between programs matching the search term and programs related to the matching programs. One manner in which such closeness or separation may be shown is by relative colors of the cells in a grid, similar to the display of a thermal map, with colors ranging steadily from blue (farthest) to red (closest), or another appropriate color scheme.

For example, a user may input a search term such as "Star Trek II: The Wrath of Kahn." Instances or episodes of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or large sizing). Instances of Star Trek movies other than "Star Trek II: The Wrath of Kahn" in the schedule grid 120, such as "Star Trek: The Motion Picture," "Star Trek III: The Search for Spock." "Star Trek IV: The Voyage Home," "Star Trek V: The Final Frontier," "Star Trek VI: The Undiscovered Country," "Star Trek: Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies). In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting (e.g., no highlighting at all) indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The overall groupings 116 themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means (e.g., as presented in response to a search for "Freaks and Geeks" or "Square One"), but when shown a background photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A "more" control 158 indicates when more episodes or program instances exist that are not shown in the schedule entries 156. The "more" control 158 also indicates how many more entries exist. A user may select the "more" control 158 to present the additional entries. In addition, a user may select the "additional results" control 118 to present additional groupings. The "additional results" control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off from the grid in half-hour increments and channel-by-channel with the cell size maintained. In this manner, navigation of the grid 120 may occur in the same way (e.g., dragging of grid cells) even when the window is shrunk, and there need not be a need for scroll bars in the navigation.

FIG. 1B shows an additional details box that is not shown in the corresponding display in FIG. 1. The details box may be generated, for example, when a user hovers a mouse pointer over a particular cell for a sufficient period of time. The details box may show additional information as provided in the figure, and may also include controls whose selection causes a list of upcoming showings of the program to be displayed, or causes a details page to be displayed.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162*a-c* that may be performed using the program. The program details area 132 also includes information 166 associated with the program, such as an image from the program, the name of the series or program, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, such as a structured collection of images, using the search term or other information associated with the program.

The search details area 142 presents web pages and web page information associated with the program. The web pages are retrieved by performing a search, for example, of the internet using the search term or other information associated with the program.

In addition, the details page 106 may include a video details area. FIG. 1D shows a video details area 170 that may be included in the details page 106 (but for a different program in this example). The video details area 170 may present a thumbnail image or sample frame or frames (e.g., a short clip) of the video and a link to where the video may be found. The video or videos associated with the program may be retrieved by performing a search, for example, of the internet using the search term or other information associated with the program, or a search of videos at a site such as YouTube. The videos may include videos of other episodes of the program, or may include publicly made videos about the program, among other things.

As one example, keywords may be associated with a program, either manually or by analysis of characteristics of the program and a transcript of the episode. Those keywords may be used to identify matching videos. For example, an episode of JAG may include extensive discussions of aircraft carrier jet landings (as determined from a closed caption script of the program), so that video details area 170 for that episode includes results of videos showing spectacular carrier landings.

A user may select one of the images 140*a-d* and be directed to a web page where the image may be found. In addition, the user may select one of the web page links 142*a-c* to be directed to the web page where a reference to the program was found. In certain implementations, the user may input a rating and/or comment for the program. Other users may then view the rating (or a composite rating from multiple users) and/or comment provided by the user. In certain implementations, a user may customize the types of information presented in the details page 106, such as images, web pages, videos, or other media.

Figure 2A:
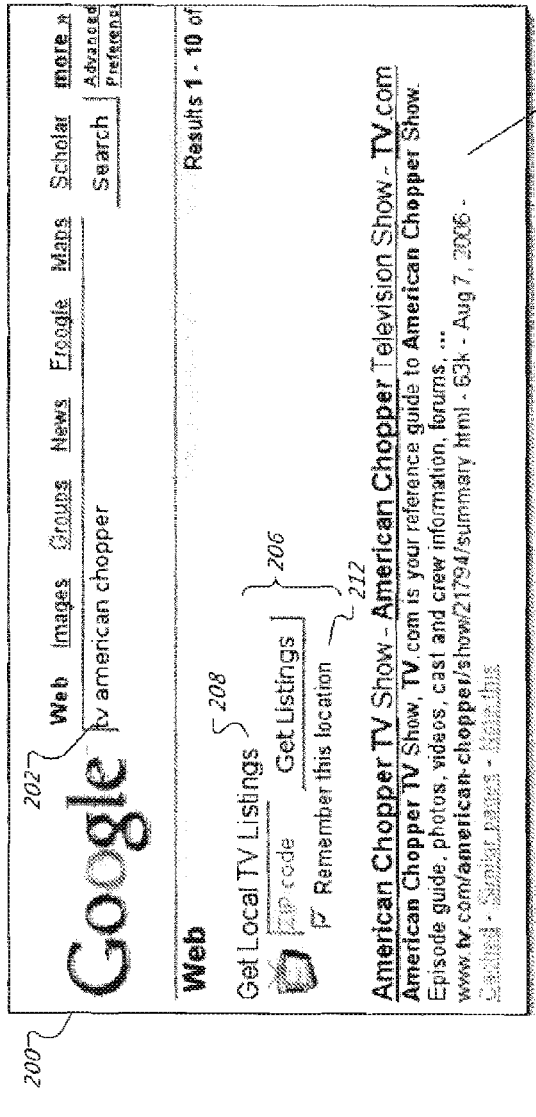
FIGS. 2A and 2B show displays for resolving a head end for a user of a program guide service.
Figure 2B:
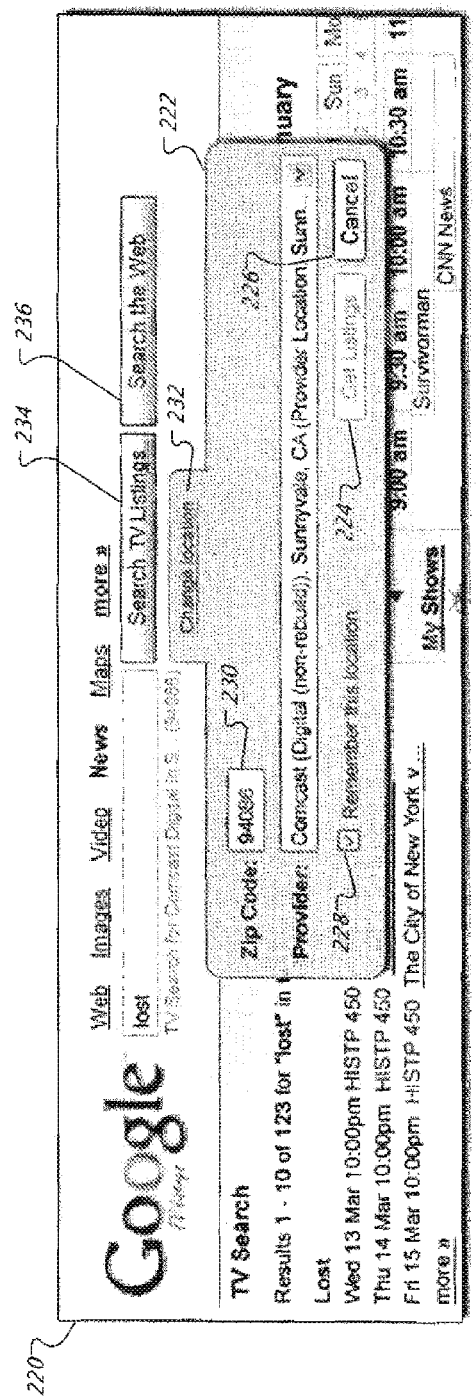

FIGS. 2A and 2B show displays 200 and 220, respectively, for resolving a head end for a user of a program guide service. The display 200 is a web search page. The display 200 includes a search control 202 where a user may input a search term. The program guide service can determine that the search term may be related to a media program. For example, the program guide service may recognize the search term as the name of a program or an episode of a program. Alternatively, the program guide service may recognize a keyword in the search term, such as "television," "TV," or "movie," indicating that the search term may be related to media programming.

In addition to web page search results 204, the program guide service will present media programming information in a media program information area 206. However, in order to determine the media providers, or head ends, accessible to or used by the user, the program guide service may request additional information from the user. The display 200 includes a location identification control 208. In this example, a ZIP code or postal code is requested from the user using the location identification control 208. In another example, other location identification may be used, such as a country, region (e.g., state or province), and/or city. The user may select a "Get Listings" control 210 to retrieve media program information associated with the search term in the search control 202 and available in the location specified in the location identification control 208. The display 200 also includes a "remember this location" control 212. If selected, the user's location information may be stored, for example, in a database at a web server or in a cookie at a client device, and used in a subsequent media programming search.

Referring to FIG. 2B, the display 220 is a portion of a media program search landing page. The display 220 includes a change location display 222. The change location display 222 allows a user to change the location used to determine media providers or head ends available to the user. Such a display 220 may be shown after a user has identified a head end, but then chooses to correct or otherwise update their head end—such as if they determine that the programs shown in their program guide do not match the programs they are seeing on their display device.

The user may complete the update to the location by selecting a "Get Listings" control 224 or cancel the update by selecting a "Cancel" control 226. Again, the location information may be saved for subsequent media programming searches by selecting a "Remember this location" control 228. Here, a location identification control 230 includes a ZIP code and also a provider associated with the specified ZIP code. The user may select a specific media provider that provides media programs to the user, using a drop down selection. The selected media provider is used to determine the channels or head end to present to the user. The user may initiate the change location display 222 by selecting a change location control 232. The user may initiate a search for media programming using a search term by the selecting a media search control 234. Alternatively, the user may initiate a web search using the search term by selecting a web search control 236.

In certain implementations, a landing page may present groupings and a schedule grid containing channels from multiple media providers, for example, when a specific media provider is not known. The schedule grid may contain a control that allows the user to indicate when a particular channel is not available to the user. The program guide service may use the channel availability information to determine the media provider or providers available and/or utilized by the user.

In some cases, the determination of a user's head end can be relatively straightforward, such as when the user resides in a rural area where perhaps one or two media broadcasters exist. In such a case, simply entering the user's zip code (as described above) may result in the proper identification of the broadcast head end, and an appropriate programming schedule may be transmitted to the user. However, it may be more difficult to determine a user's head end (and therefore an appropriate programming schedule) if the user resides in an area that has many media broadcasters, such as in or near large metropolitan areas; and especially where broadcast coverage for multiple metropolitan areas overlap.

Although identifying a particular head end with certainty is definitely possible, it may not be practical in certain situations. For example, design guidelines may dictate that a system require only a minimum level of input from users so as to ensure that the system remains very easy to use. As one example, a search system may limit its applications to asking one or maybe two questions of a user after the user has been presented with search results. In the figures, the one question may be the user's zip code. Alternatively, a user may be unable to provide enough information to identify a particular head end—for example, the user viewing the display in FIG. 2B might only know their zip code, and might be unable to identify the company from which they get media programming. In such a situation, one or more head ends may be identified for the user from incomplete information.

Figure 3:
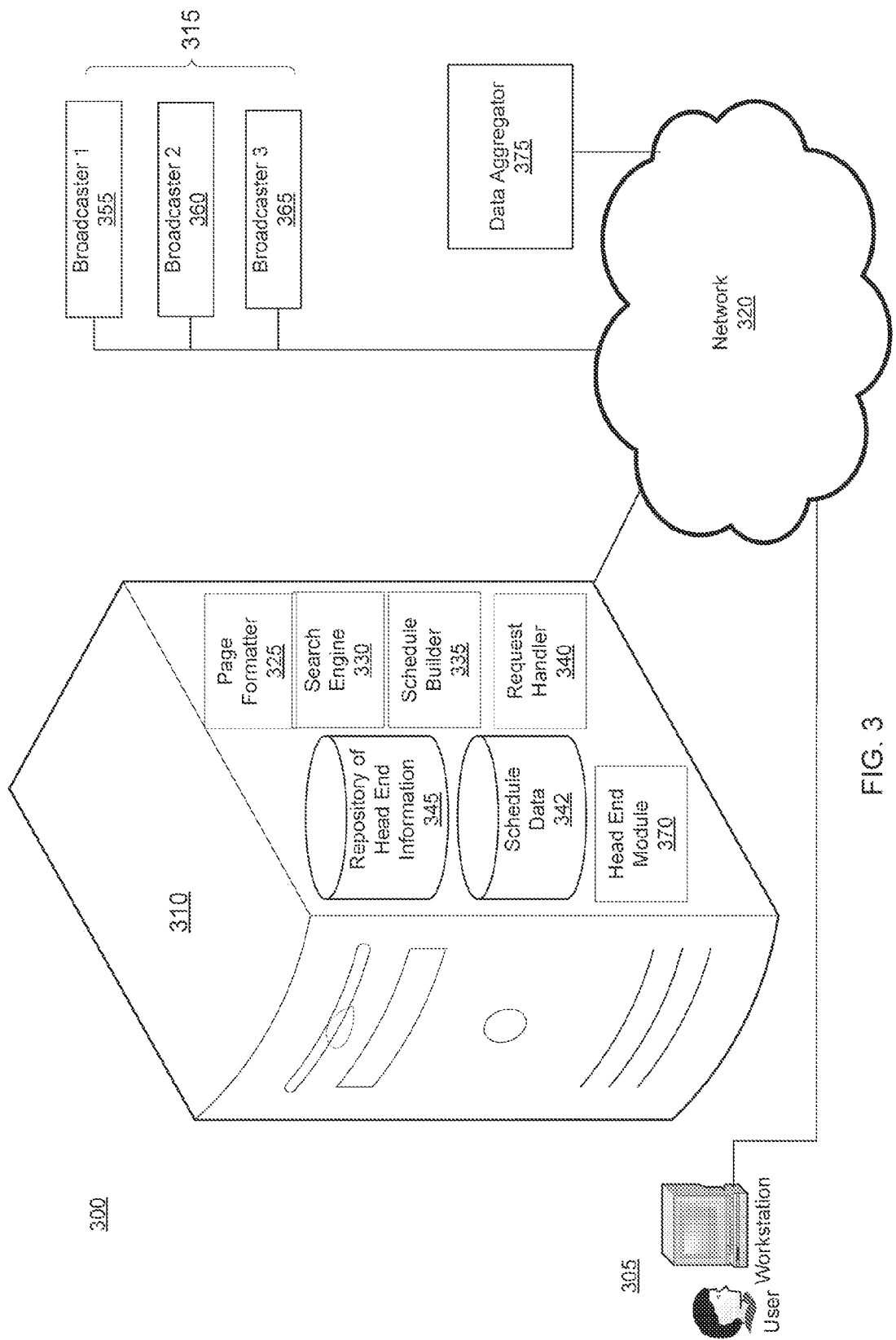
FIG. 3 shows a system for determining a user's most likely head end from a group of head ends.

FIG. 3 shows a system 300 for determining a user's most likely head end or head ends from a group of head ends. The system 300 can include a server 310, multiple broadcast head ends 315, a remote computer 305 (the user's computer), and a network 320 that allows data connectivity between each of the system components. The server 310 can include modules and data repositories that perform the computational functions of determining a "best guess" or guesses for a user's head end.

For example, the server 310 may include a request handler 340 that receives requests from the remote user computer 305. An exemplary request may include the transmitted data that the user's computer 305 sends to the server 310 when the user inputs their zip code to identify their head end, as generally described above with respect to FIGS. 2A and 2B. The request handler 340 can perform the functions of parsing the request into components (e.g., extracting a zip-code or city, or an address) and passing that data on to other structures in the server 310.

The request handler 340 may, in some instances, pass the user's information directly to a head end module 370; the head end module 370 can determine, in a broad sense, how many broadcast head ends 315 exist (and the identity and/or characteristics of the head ends 315) in the user's area based on the user's input. The head end module 370 may compare the user's information with that stored in a repository of head end information 345, for example, in making such a determination.

The repository of head end information 345 may contain search results from prior searches that have successfully identified a user's head end based on location search criteria. Likewise, the repository 345 can contain known broadcast area coverage that may be provided by the multiple broadcasters 315, data aggregators 375, and further can contain publicly-available subscriber data for networks or broadcast providers in the user's area.

Data aggregator 375 can be, for example, third-party program schedule providers, including online programming sources such as TV Guide (www.tvguide.com), and the internet movie database website (www.imdb.com). Data aggregator 375 can also be a network website such as the HBO website (www.hbo.com) that lists programming and schedule information.

Schedule data 342 may also be stored, and may represent data received, for example, from data aggregator 375, either it the format in which it is received or in a reformatted manner. The schedule data may be keyed to particular headends, so that, for example, a particular set of programs may be associated with a national network, and various head ends that carry the national broadcast may be associated with it and may have particular ones of their channels associated with it. In this manner, a schedule may be formed by initially querying the schedule data 342 database using a time period and an identification of one or more head ends, and perhaps with a channel restrictor (e.g., only sports or only movies channels).

Providing a likely head end assignment for a user may come from an analysis of the user's input information against information stored in the repository 345. For example, a user 305 in rural Alaska may input her town name in a search control 202. The request handler 340 may pass this information to the head end module 370, which may then look for a match against the data in the repository 345 for the town name; if only one or two head ends provide coverage for that area, that data can be transmitted back to the user 305, as described more fully below.

In many cases, the choice, or best guess, of a user's head end will not be limited to one; in such cases, the system 300 can provide a programming schedule (generally described in FIG. 4) that provides the programming information from the most likely head end(s) of the user. In such a situation, the head end module 370 may select a single most-likely head end. For example, head end module 370 may access data about the number of subscribers for systems associated with particular head ends, and the head end module 370 may select the head end having the highest market share in the area. The selection may also be based upon the number of channels a head end receives, the ubiquity of those channels, and/or an analysis of previous system usage to determine popular head ends.

In determining likely user head ends, a decision or statistical analysis of multiple head end listings can be used to determine a list of channels aggregated across all the head ends to show the user. The choice to show a station in a given zip code can incur some amount of utility or loss to the user. The following derivation can assume that the loss for showing the user a station that they can get is zero (0), and likewise the utility for not showing the user a station they do not receive is also zero. The user can incur some loss in utility if a station is shown that they do not receive ("$L_1$"), and likewise if stations are not shown that they do receive ("$L_2$"). Decision theory states that a given station X should be shown to a user if:

$$P(a\mid c)\times L_2 > P(b\mid c)\times L_1$$

or $$\frac{P(a\mid c)}{P(b\mid c)} > \frac{L_1}{L_2},$$

where P(a|c) is the probability that a user receives station X in zipcode c, and P(b|c) is the probability that the user does not receive station X in zipcode c. Assuming a uniform distribution over head ends, $$P(a\mid c) = \frac{d}{f}, \text{ and } P(b\mid c) = \frac{e}{f},$$

where d is the number of head ends with X in the zip code, e is the number of head ends without X in the zip code, and f is the total number of head ends in the zip code, and so, $$\frac{P(a\mid c)}{P(b\mid c)} = \frac{d}{e}.$$

Regarding the values for $L_1$ and $L_2$, if $L_1$=infinity, then $L_2/L_1$=0, and the system can always choose to show station X to the user. If $L_2$=infinity, then $L_2/L_1$=infinity and station X is shown only if it is carried on each head end. However, in the case that $L_1=L_2$, then station X can be shown when $$\frac{d}{e} > 1.$$

This can be the case when the majority of head ends in a zip-code carry station X. Decisions can be made by computing a "weighted" majority rather than a "straight" majority, if head ends are known for users, because P(a|c) and P(b|c) can be estimated accurately based on the number of users that receive station X.

If the head end module 370 determines that adequate information does not exist in the repository of head end information 345 to identify a head end (or most likely head end) responsive to the user's request, it may construct a program guide that is a composite of the programming information from the multiple head ends that are each likely candidates. One of the likely head ends can be identified as a most likely head end, and its programming can be given prominence in the composite guide (e.g., by sorting the channels according to that head end).

In another embodiment, a schedule builder 335 can collect programming schedule information relating to the broadcasters 315, from data aggregators 375 such as is generally available from third-party programming vendors and websites. The programming information may be obtained in real time from such vendors, or may be previously downloaded into the repository of head end information 345.

Figure 4:
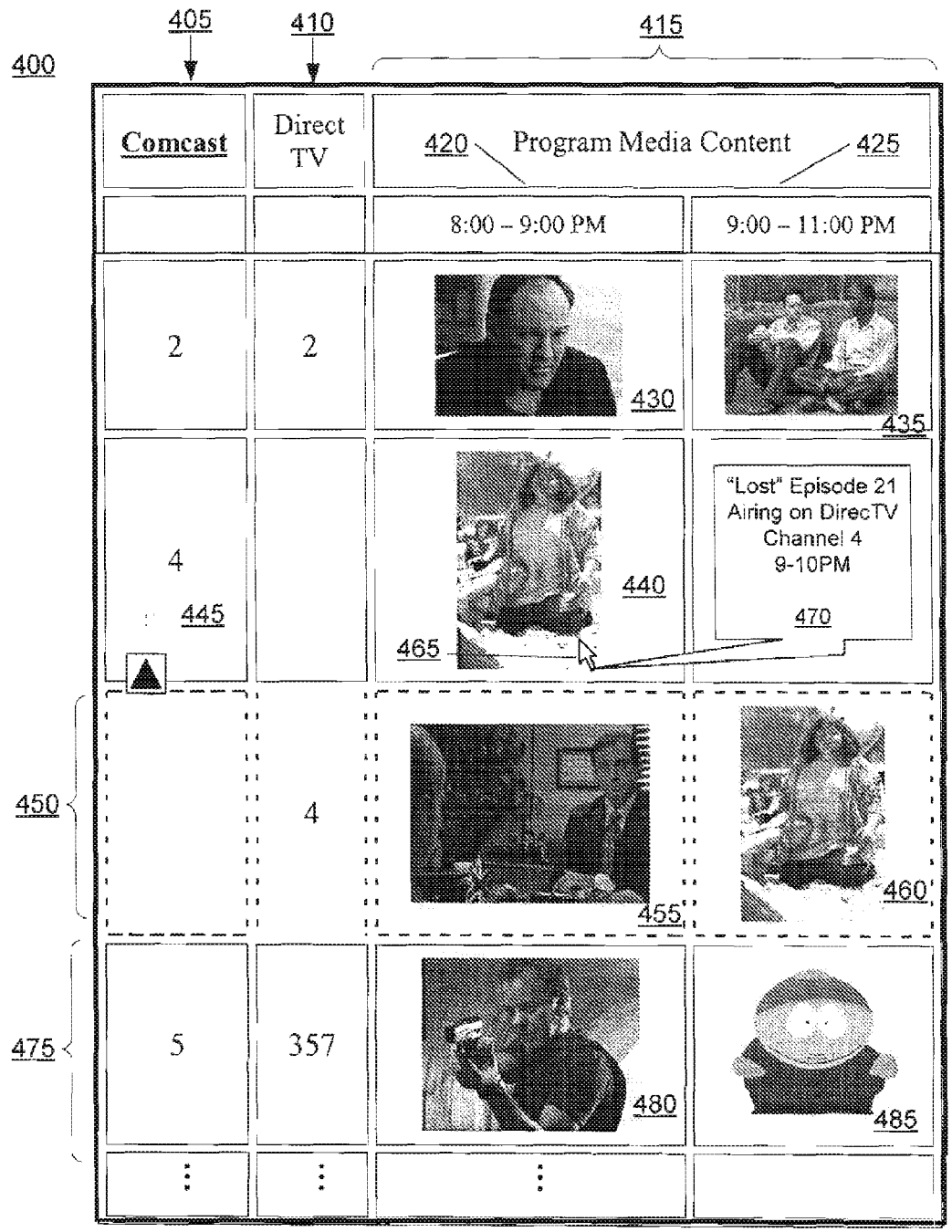
FIG. 4 shows programming content from multiple head ends.

A page formatter 325 may perform actions of, among other things, presenting data in formats like those shown in FIGS. 1A-1D, and in appropriate circumstances, combining data from multiple head ends to produce a composite program guide showing programming information for all possible or probable head ends associated with a particular user (generally described with respect to FIG. 4). In one implementation, the user can then view the guide and their television concurrently and match the programming content with one of the identified head ends so as to eliminate any remaining ambiguity, and so as to result in the display of programming for only that single head end.

To provide more interactive information in a program guide, a search engine 330 can seek broadcast information from head ends in proximity to the user's area. Such information may be collected by matching the user's location information with publicly-available addresses for local cable or broadcast networks. In many cases, a cable modem termination system (CMTS) is located at a local office of a cable or broadcast company; the CMTS may be a close match to the user's head end. The search engine 330 may download broadcast information from each of the broadcasters found for the user's area (e.g., broadcasters 1-3 (355, 360, 365 respectively in FIG. 3.)) In some embodiments, the search engine 330 may initiate capture of broadcast information, such as capturing a live feed, or "frame grabs" of programming from each broadcaster 315 at selected time intervals (e.g., one frame grab every 5 minutes). This media content can be incorporated into an interface that shows programming content from multiple head ends, and can be presented according to "rank" of most likely user head end.

FIG. 4 shows programming content from multiple head ends. A program guide 400 exemplifies an output of a system such as system 300, in response to a user request for programming content in an area where the head end of the user can not be absolutely determined. The program guide can display episodes of programs using images associated with the programs, though other formats, such as traditional formats that show a grid of rectangular cells containing a name of a program, may also be used.

The program guide 400 shows that Comcast has been selected as the user's most likely head end because the channels (e.g., channels 2, 4, 5, etc.) that correspond to Comcast for the head end in the user's area are shown in the far-left column 405. The next most likely programming source may come from a Direct TV head end, column 410, and likewise, channels (2, 4, 357). corresponding to Direct TV's programming are indicated in the column for that head end.

Column(s) 415 can show programming information collected such as by the server 310, i.e., generally by the processes described with respect to FIG. 3. Column 415 can be broken into smaller sub-columns, 420, 425, that indicate time slots when various programs air. The contents of the cells, e.g., cells 430 and 435, can contain information that relates to the program or media that is scheduled for the given channel and time, as is customary in on-line programming guides. In this example, visual image information is presented in the cells, which could be frame-grabs of currently-airing programs, live feeds, or still-images that related to the episode of the program, for example.

A system can provide such a generalized or composite program guide 400 by matching program content across multiple head ends and presenting a condensed media-related results set similar to that shown in FIG. 4. This functionality can remove the need to provide multiple complete schedules for each head end identified as a potential head end of the user.

For example, the guide 400 can be configured so that Comcast, the primary provider that the system has determined to be the most likely head end source in this example, shows its channels listed in sequential order down column 405. The media content for those channel can be shown in the corresponding cell for a given time slot. Channels corresponding to the next most likely head end source(s) can be shown in columns next to the primary source, e.g., column 410 for Direct TV.

A structure such as head end module 370 in FIG. 3 can determine the media content and programming for a given head end, channel, and time slot. In this example, the head end module 370 can identify that the show "The Sopranos" is airing on Comcast channel 2 (for a given head end) from 8:00 to 9:00 PM. Similarly, head end module 370 has identified the shows "Lost," and "24" on Comcast channels 4 and 5 respectively.

In this example, The Sopranos is also airing on channel 2 for the Direct TV provider during the same time slot, and logically, channel 2 is indicated in the composite guide as the appropriate channel for this show (and shows in the same general time range) for both the Comcast and the DirectTV head ends. Cells 430 and 435 can indicate that, for both the Comcast and the Direct TV head ends, channel 2 is a match for programming content, and it may be highly likely that the user can watch either The Sopranos or "Shawshank Redemption" (cell 435) if they turn their television to channel 2.

Continuing with the exemplary schedule 400, Comcast's channel 4 is airing an episode of "Lost" (cell 440) from 8:00-9:00 PM, but there is no corresponding channel indicated in the guide for Direct TV. Instead, channel 4 on DirectTV is broadcasting different content, and no channel provided by DirectTV is carrying the content from channel 4 on Comcast. As a result, column 405 contains a channel indicator, while column 410 is blank in the same row.

Corresponding channels from a second head end that do not match content for channels from the first, most likely, head end may also be hidden from view initially. A user can check to see what programming is available on other providers' channels (i.e., the rows in column 410) that correspond to a certain channel in the primary provider column 405, such as by performing a mouse click on an element 445 of the schedule 400. In this example, clicking on element 445 may cause a previously-hidden row of programming content to be displayed (indicated by the dashed lines in row 450) that shows the programming content for Direct TV on channel 4. This row shows that an episode of "The Office" is airing on channel 4 from 8:00-9:00 PM, and the Lost episode does not air until 9:00 PM. Alternatively, the schedule may be displayed initially as shown in the FIG. 4, with all of the composite channels shown.

Other embodiments provide the functionality of finding programming information on non-primary head ends from a primary head end source. For example, the user may wish to find the episode of Lost that is currently airing on Comcast's channel 4 on a Direct TV channel. Exemplary functionality is shown in cell 440, where the user has positioned a cursor 465 over the media image, causing a pop-up box to appear with detailed information on where they can find the selected episode of Lost from a Direct TV head end. The particular episode that is sought may not be in the same general time frame as the Comcast episode being displayed, so the system may provide a control that, when selected by a user, causes the user's PVR or similar device to record the episode.

The system 300 can also match channels for different head ends broadcasting the same content on the particular channels. Referring to row 475, both the Comcast and Direct TV head ends are broadcasting, or have scheduled broadcasts of, episodes of "24" (cell 480) and "South Park" (cell 485) concurrently, but on different channels. The system 300 performs a search to match the programming content from a given head end to the channel of another head end, and presents those channels in the schedule 400 in a common row. For example, the system 300 has found that both "24" and "South Park" are provided on Direct TV's channel 357, and so it can be listed as a channel option for the user next to the primary head end source, channel 5.

The example programming schedule 400 above is presented using visual indicia of programming content, however, schedules can similarly be constructed of purely textual content, or a mix of visual and text content.

Figure 5:
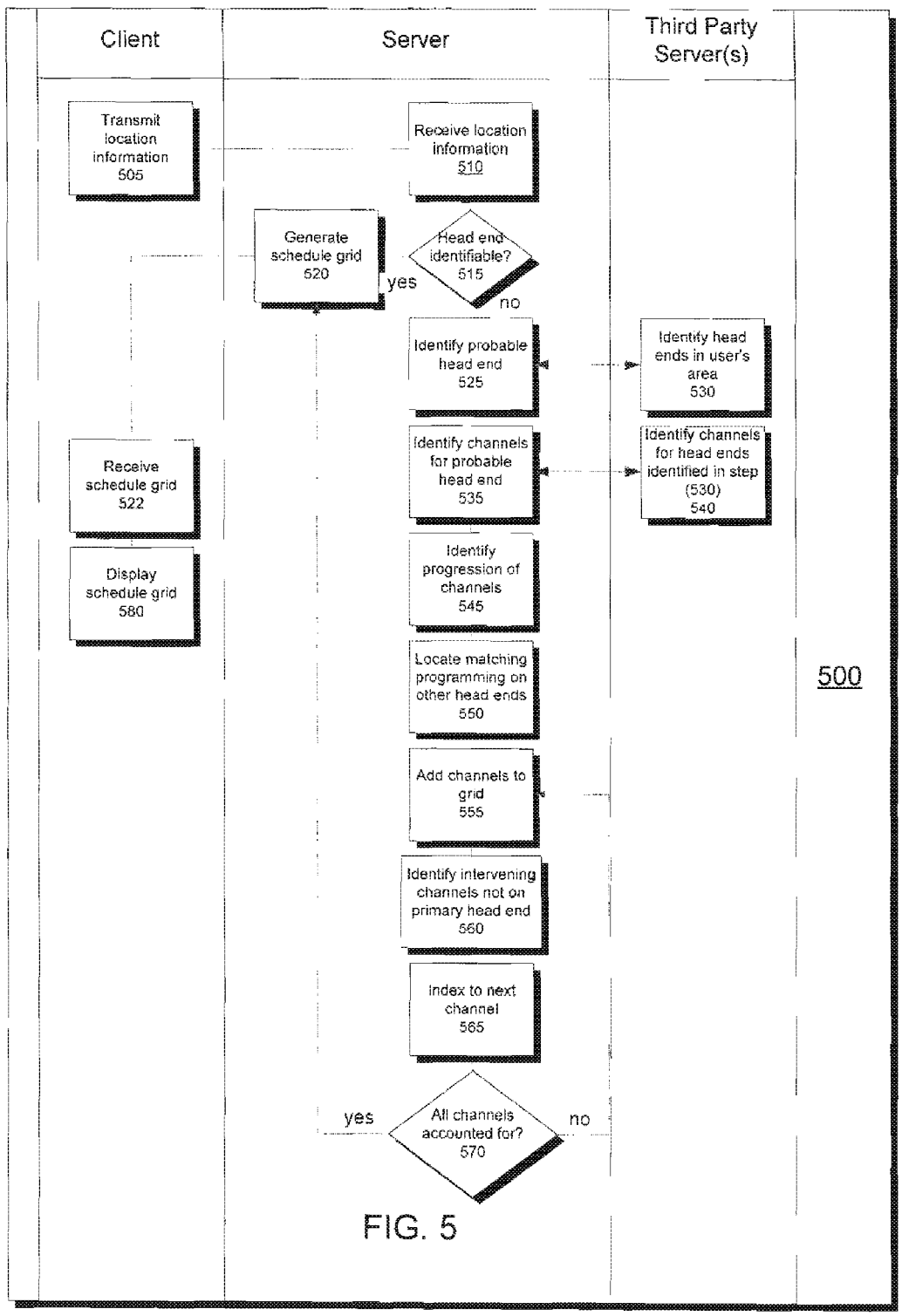
FIG. 5 is a swim-lane diagram showing various computer-implemented processes relating to head end identification.

FIG. 5 is a swim-lane diagram showing various computer-implemented processes 500 relating to head end identification. The steps shown in the diagram can be performed using the systems discussed above and can be used to carry out the processes described above. Particular operations are shown for clarity as occurring on a client device, a server (which may include a group of multiple servers, such as servers in a large server farm or data center), and on a third-party server or servers.

Beginning at box 505, information that the user entered into a search control (e.g., search control 202) is transmitted to the server through a network; the server receives this information at box 510. If the head end is determined to be identifiable, that is, if passing the information to a head end module as generally discussed with respect to FIG. 3 results in identification of a particular head end with a high level of certainty, then the server may generate the media-related results set (box 520) that corresponds to the programming schedule of the identified head end, and may transmit that information to the user, perhaps with additional information such as that shown in FIGS. 1A-1C. The user receives the media-related results set at box 522.

The server may then attempt to identify a particular head end as a most likely head end, such as by using market share data as explained above. If such actions are not sufficient to identify a single head end with sufficient confidence, the server may attempt to identify a probable head end (box 525), by, for example, using the market share data or polling third-party servers that can provide and transmit head end information in the user's area (box 530). Alternatively, rather than selecting a single (most probable) head end, a composite of multiple head ends may be selected. This can be considered a "virtual" head end.

Channels can then be identified that correspond to the identified head ends (box 535), again, by polling third-party servers (box 540). The third-party servers may be servers operated by services that provide programming information for a variety of broadcaster and head ends. Such schedule information may also be preloaded to the server so as to avoid the need for real time requests to third party servers.

At box 545, a progression of channels can be identified that can be used to set the logical order of the channel "line up" displayed in the primary head end column, e.g., column 405 in FIG. 4. The progression may be in numerical order, e.g., channel 2, 4, 5, 7, 8 . . . etc., or, the progression can be in alphabetical order according to broadcaster, e.g., ABC, CBS, FOX, NBC . . . , etc., or, the progression may be in alphabetical order according to show title, among other similar variations. The numerical order may correspond to the numerical order of channels for the most likely head end of the multiple identified possible head ends. A subset of channels from the head ends may be selected by using, for example, decision theoretic criteria to determine the channels most likely to provide utility to the user, as described above.

A program guide may be built by stepping though each channel in order for the most likely head end. For each channel, the programming for a time frame into the future may be obtained by the system. At box 550, matching programming from other head end(s) can then be identified for a given channel of the primary head end (e.g., the head end that the server 310 calculates as the user's most probable head end), and indicators for the corresponding channels and/or content can be added to the schedule. For example, if the search process finds that content on channel 2 of the second head end matches content on channel 2 of the first head end, then the number 2 may appear in both channel columns of a program guide.

At box 555, channel numbers may be added to the schedule for those channels that match the programming of a primary head end channel, similar to the row 475 in FIG. 4 that indicates matching content for channels 5 (Comcast) and 357 (Direct TV). When a row has been determined for one channel of the likely head end (e.g., program information has been received, and channels for one or all of the relevant head ends have been inserted), then the process may index to the next number in the list of channels for the primary head end.

Other channels from non-primary head ends that may not match content from the primary head end can be added to the schedule at step 560. For example, the primary head end may not broadcast a signal on channel 455, but this channel is used by a secondary head end; channel 455 may be added to the schedule at an appropriate location, and may be optionally "hidden" until the user initiates the viewing of the channel. In one implementation, the intervening channels can be added as the schedule is built one channel at a time with respect to the primary head end channel line up.

At box 565, the next channel of the guide is produced (i.e., another row of the schedule 400 is added). Decision 570 accounts for whether all channels of the primary and, in some embodiments, the non-primary head end channels have been accounted for. If not, boxes 555-565 can be repeated until this condition is satisfied. When all channels have been accounted for, the server generates code for the media-related results set (box 520), where it is then received by the user, step 522.

The media-related results set can be made up of passive markup code that simply displays a program guide. In addition, the media-related results set may be constructed of a number of tiles, like tiles provided in the Google Maps application. The media-related results set shell may be constructed using HTML and JavaScript, and may make requests to the server for additional tiles, such as when a user drags the media-related results set in one or more directions.

Figure 6:
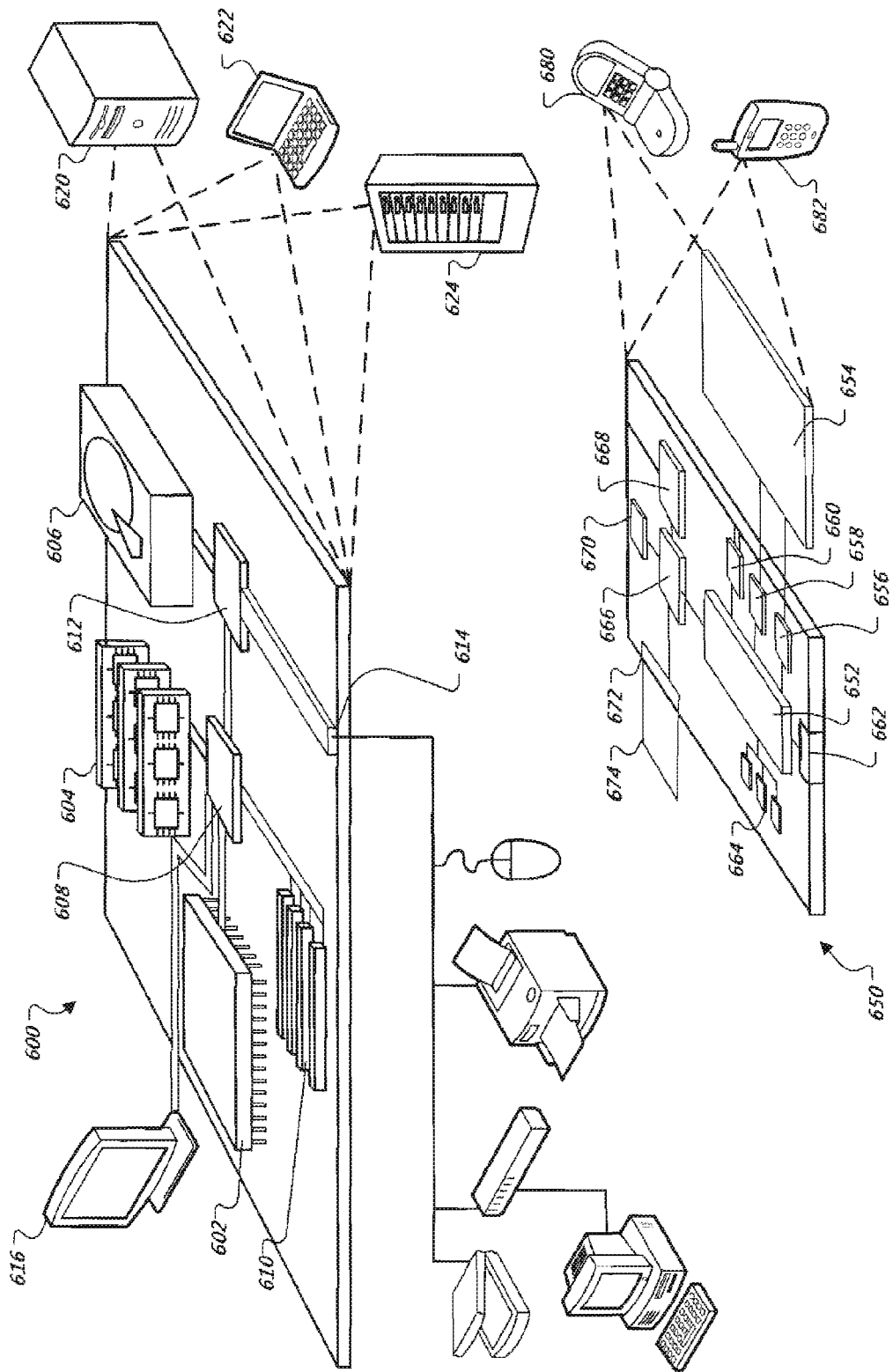
FIG. 6 shows an example of a computer device and a mobile computer device that can be used to implement the techniques described here.

FIG. 6 shows an example of a computer device 600 and a mobile computer device 650 that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units.

Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, although the techniques described above are said to relate to head ends, that term should be understood to include various sources or mechanisms for sourcing multimedia content. Accordingly, other embodiments are within the scope of the following claims.

What is claimed is:

1. A computer-implemented method, comprising:
receiving, at a computer system, information that relates to a geographic location of a user of media services, wherein the received information does not uniquely identify one media broadcast head end for the user;
identifying a plurality of broadcast head ends responsive to the received information, where each broadcast head end provides service coverage with scheduled broadcast media to a particular geographic area that includes the geographic location of the user;
identifying a first broadcast head end of the plurality of broadcast head ends that provides content that is available to the user, as compared to one or more others of the plurality of broadcast head ends that provide service coverage with scheduled broadcast media to the particular geographic area that includes the geographic location of the user; and generating, for presentation to the user, a condensed program guide that is formatted to display channels from the first broadcast head end and channels of the others of the plurality of broadcast head ends in a single program guide, wherein particular channels from the first broadcast head end are displayed in a first area and channels from one or more of the others of the broadcast head ends are displayed in separate areas according to a decreasing likelihood of a capability to provide content that is available to the user at the geographic location of the user.

2. The method of claim 1, wherein the received information comprises a zip code.

3. The method of claim 2, further comprising accessing a database identifying a plurality of broadcast head ends associated with the zip code.

4. The method of claim 1, wherein identifying the plurality of broadcast head ends includes submitting the received information as a query to repository of head end information.

5. The method of claim 1, further comprising aggregating the channels on a per-channel basis.

6. The method of claim 1, wherein the plurality of broadcast head ends is determined by comparing a factor that is based on a probability that the user receives a channel or head end, with a factor based on a probability that the user does not receive the channel or head end.

7. The method of claim 1, wherein the program guide shows channels for each head end associated with a row of programming in a program guide.

8. A computer-implemented method, comprising:
receiving at a computer system information relating to a geographic location of a user of media services;
determining at the computer system that the received information does not uniquely identify a particular media distribution source;
identifying a plurality of media distribution sources responsive to the received information, where each of the media distribution sources provides media distribution with scheduled broadcast media to a particular geographic area that includes the geographic location of the user;
identifying a first media distribution source of the plurality of media distribution sources that provides content that is available to the user, as compared to one or more others of the plurality of media distribution sources that provide media distribution to the particular geographic area that includes the geographic location of the user; and
generating, for presentation to the user, a condensed program guide that is formatted to display channels from the first media distribution source and channels of the others of the plurality of distribution sources in a single program guide, wherein particular channels from the first media distribution source are displayed in a first area and channels from one or more of the others of the distribution sources are displayed in separate areas according to a decreasing likelihood of a capability to provide content that is available to the user at the geographic location of the user.

9. The method of claim 8, wherein determining that the received information does not uniquely identify a particular media distribution source includes submitting a query relating to the received information to a head end database and receiving a result of multiple head ends.

10. The method of claim 8, further comprising aggregating the channels on a per-channel basis.

11. The method of claim 1, wherein identifying the first broadcast head end includes determining whether one or more locations of the other head ends are within a predetermined distance from the geographic location of the user, and selecting, for display to the user, channels from one or more head ends that have a location determined to be within the predetermined distance.

12. The method of claim 1, wherein identifying the first broadcast head end includes identifying market share levels that correspond to a number of subscribers that subscribe to each of the plurality of broadcast head ends, and selecting one of the plurality of broadcast head ends as the first broadcast head end based at least in part on the size of a market share level associated with each of the plurality of broadcast head ends.

* * * * *

UNITED STATES PATENT AND TRADEMARK OFFICE
CERTIFICATE OF CORRECTION

PATENT NO. : 8,522,281 B1
APPLICATION NO. : 11/742460
DATED : August 27, 2013
INVENTOR(S) : Mehran Sahami et al.

It is certified that error appears in the above-identified patent and that said Letters Patent is hereby corrected as shown below:

On the Title Page:

Column 2 (Abstract), line 4, delete "he" and insert -- the --, therefor.

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,522,281 B1 |
| APPLICATION NO. | : 11/742460 |
| DATED | : August 27, 2013 |
| INVENTOR(S) | : Sahami et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this
Twenty-seventh Day of January, 2015

Michelle K. Lee
*Deputy Director of the United States Patent and Trademark Office*